United States Patent [19]

Wambach

[11] 4,113,692
[45] Sep. 12, 1978

[54] REINFORCED THERMOPLASTIC COMPOSITIONS OF POLYESTER RESINS AND A POLYCARBONATE RESIN

[75] Inventor: Allen Dale Wambach, Evansville, Ind.

[73] Assignee: General Electric Company, Pittsfield, Mass.

[21] Appl. No.: 747,635

[22] Filed: Dec. 6, 1976

[51] Int. Cl.$^2$ ............................................. C08K 7/14
[52] U.S. Cl. ................................. 260/40 R; 260/860
[58] Field of Search .......................... 260/860, 40 R

[56] References Cited

U.S. PATENT DOCUMENTS

| 3,218,372 | 11/1965 | Okamura et al. | 260/860 |
| 3,953,394 | 4/1976 | Fox et al. | 260/860 |
| 3,953,539 | 4/1976 | Kawase et al. | 260/860 |
| 4,044,073 | 8/1977 | Baron et al. | 260/860 |

*Primary Examiner*—Sandra M. Person
*Attorney, Agent, or Firm*—Morgan, Finnegan, Pine, Foley & Lee

[57] ABSTRACT

Reinforced thermoplastic compositions are provided comprising a poly(1,4-butylene terephthalate) resin, a poly(ethylene terephthalate) resin, a polycarbonate resin and a fibrous glass reinforcement. The compositions are moldable to articles having improved resistance to heat distortion or warpage in comparison with molding compositions of glass reinforced poly(1,4-butylene terephthalate).

7 Claims, No Drawings

REINFORCED THERMOPLASTIC COMPOSITIONS OF POLYESTER RESINS AND A POLYCARBONATE RESIN

This invention relates to glass reinforced molding compositions which have improved heat distortion resistance in the molded article. More particularly, it pertains to compositions comprising a poly(1,4-butylene terephthalate) resin, a poly(ethylene terepthalate) resin, a homopolycarbonate resin and as a reinforcement therefor, glass fibers.

BACKGROUND OF THE INVENTION

High molecular weight linear polyesters and copolyesters of glycols and terephthalic or isophthalic acid have been available for a number of years. These are described inter alia in Whinfield et al, U.S. Pat. No. 2,465,319 and in Pengilly, U.S. Pat. No. 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, in comparison with other thermoplastics, offer a high degree of surface hardness and abrasion resistance, high gloss, and lower surface friction.

It has been previously disclosed in co-pending application Ser. No. 662,910 filed Mar. 1, 1976, assigned to the same assignee as herein, that glass reinforced thermoplastic compositions of a polycarbonate resin and poly (1,4-butylene terephthalate) can be molded to articles having greater resistance to warpage or heat distortion, in comparison with glass fiber reinforced poly(1,4-butylene terephthalate) resins.

It has now been discovered that blends of a poly (1,4-butylene terephthalate) resin, a poly(ethylene terephthalate) resin and a polycarbonate resin, reinforced with fibrous glass, possess less inherent warpage in the molded article and good moldability when compared with compositions of glass fiber reinforced poly(1,4-butylene terephthalate). The improved resistance to heat distortion is achieved without any appreciable decrease in other mechanical properties, such as heat resistance (as measured by the heat deflection temperature under load), notched Izod impact strength, tensile strength, modulus and flexural strength. In addition, the present compositions are less susceptible to increases in melt viscosity than the above-mentioned glass reinforced blends of poly(1,4-butylene terephthalate) and polycarbonate resins.

DESCRIPTION OF THE INVENTION

According to this invention, there are provided reinforced thermoplastic compositions having increased resistance to warpage in comparison with glass reinforced poly(1,4-butylene terephthalate), useful for molding, e.g., injection molding, compression molding, transfer molding, and the like, the compositions comprising:

(a) a poly(1,4-butylene terephthalate) resin;
(b) a poly(ethylene terephthalate) resin;
(c) a polycarbonate resin, and
(d) a reinforcing agent comprising glass fibers in an amount at least sufficient to provide reinforcement.

The polyester resins of the compositions of this invention are available commercially or can be prepared by known techniques such as by the alcoholysis of esters of terephthalic acid with ethylene glycol or butane diol and subsequent polymerization, by heating the glycols with the free acids or with halide derivatives thereof, and similar processes. These are described in U.S. Pats. Nos. 2,465,319 and 3,047,539, and elsewhere.

Illustratively, these high molecular weight polyesters will have an intrinsic viscosity of at least about 0.4 deciliters/gram and preferably, at least 0.7 deciliters/gram as measured in a 60:40 phenol/tetrachloroethane mixture at 30° C.

The polycarbonate resins are preferably those which have repeating units of the formula

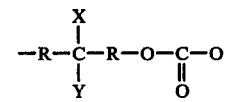

wherein each —R— is selected from the group consisting of phenylene, halo-substituted phenylene and alkyl substituted phenylene, and X and Y are each selected from the group consisting of hydrogen, hydrocarbon radicals free from aliphatic unsaturation and of radicals which together with the adjoining

atom form a cycloalkane radical, the total number of carbon atoms in X and Y being up to 12.

The preferred polycarbonate resins may be derived from the reaction of bisphenol-A and phosgene. These polycarbonates have from 100–400 recurring units of the formula

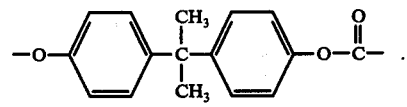

The polycarbonates are described in U.S. Pat. Nos. 3,028,365, 3,334,154 and 3,915,926, all of which are incorporated by reference to save further detail. The polycarbonate resin will preferably have an intrinsic viscosity of from about 0.3 to 1.0, more preferably from about 0.3 to 0.45, as measured in methylene chloride at 20° C.

The filamentous glass to be employed as reinforcement in the present compositions is well known to those skilled in the art and is widely available from a number of manufacturers. For compositions ultimately to be employed for electrical uses, it is preferred to use fibrous glass filaments comprised of lime-aluminum borosilicate glass that is relatively soda free. This is known as "E" glass. However, other glasses are useful where electrical properties are not so important, e.g., the low soda glass known as "C" glass. The filaments are made by standard processes, e.g., by steam or air blowing, flame blowing and mechanical pulling. The preferred filaments for plastics reinforcement are made by mechanical pulling. The filament diameters range from about 0.00012 to 0.00075 inch, but this is not critical to the present invention.

The length of the glass filaments and whether or not they are bundled into fibers and the fibers bundled in turn to yarns, ropes or rovings, or woven into mats, and the like, are also not critical to the invention. However, in preparing the molding compositions, it is convenient to use the filamentous glass in the form of chopped strands of from about one-eighth to about 2 inches long. In articles molded from the compositions, on the other hand, even shorter lengths will be encountered because, during compounding, considerable fragmentation will occur. This is desirable, however, because the best properties are exhibited by thermoplastic injection molded articles in which the filament lengths lie between about 0.000005 and 0.125 (one-eighth) inch.

In general, best properties will be obtained if the sized filamentous glass reinforcement comprises from at least about 1% by weight and, preferably, from about 1 to about 60% by weight, based on the combined weights of components (a), (b), (c) and (d).

The resinous components can vary widely in amount. Preferably, however, the composition will comprise from about 1 to about 98% by weight of poly(1,4-butylene terephthalate), from about 1 to about 98% by weight of poly(ethylene terephthalate) and from about 1 to about 98% by weight of the polycarbonate resin, the total percentages adding up to 100.

The compositions of this invention can include, in addition to fibrous glass reinforcement of the type described, non-glass reinforcing fibers in combination therewith, such as mineral reinforcing fillers, e.g., talc, clay, silica, calcium silicate, mica, and the like.

Other ingredients, such as dyes, pigments, stabilizers, plasticizers, flame retardants, drip retardants, and the like can be added for their conventionally employed purposes. Illustrative flame retardant additives are disclosed in U.S. Pat. Nos. 3,833,685, 3,341,154, 3,915,926 and 3,671,487, which are hereby incorporated by reference. Other flame retardants are disclosed in U.S. Pat. Nos. 3,681,281, and 3,557,053, U.S. Pat. No. 3,830,771 and U.K. Pat. No. 1,358,080, all of which are incorporated by reference.

The amount of flame retardant additive, is used, is not critical to the invention, so long as it is present in a minor proportion based on said composition — major proportions will detract from physical properties — but at least sufficient to render the block polyester resin non-burning or self-extinguishing. Those skilled in the art are well aware that the amount will vary with the nature of the resin and with the efficiency of the additive. In general, however, the amount of additive will be from 0.5 to 50 parts by weight per 100 parts of resin.

The compositions of this invention can be prepared by a number of procedures. In one way, the reinforcement, e.g., glass fibers, and, optionally, mineral filler, is put into an extrusion compounder with the resinsous components to produce molding pellets. The reinforcement is dispersed in a matrix of the resin in the process. In another procedure, the reinforcement (d) is mixed with the resins by dry blending, then either fluxed on a mill and comminuted, or they are extruded and chopped. The reinforcing agent can also be mixed with the resins and directly molded, e.g., by injection or transfer molding techniques.

It is always important to thoroughly free all of the ingredients; resin, reinforcement and any optional, conventional additives from as much water as possible.

In addition, compounding should be carried out to ensure that the residence time in the machine is short; the temperature is carefully controlled; the friction heat is utilized; and an intimate blend between the resin and the reinforcement is obtained.

Although it is not essential, best results are obtained if the ingredients are pre-compounded, pelletized and then molded. Pre-compounding can be carried out in conventional equipment. For example, after carefully pre-drying the polyester and polycarbonate resins and the reinforcing agent, e.g., under vacuum at 100° C. for 12 hours, a single screw extruder is fed with a dry blend of the ingredients, the screw employed having a long transition section to ensure proper melting. On the other hand, a twin screw extrusion machine, e.g., a 28 mm Werner Pfleiderer machine can be fed with resin and additives at the feed port and reinforcement down stream. In either case, a generally suitable machine temperature will be about 450° to 460° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 525° F. and conventional mold temperatures, e.g., 150° F.

DESCRIPTION OF THE PREFERRED EMBODIMENTS.

The following examples illustrate the invention. They are set forth as a further description but are not to be construed as limiting the invention thereto.

EXAMPLE 1

A dry blend of poly(1,4-butylene terephthalate), intrinsic viscosity 0.8 dl/g., melt viscosity 1700 poise, poly(ethylene terephthalate), intrinsic viscosity 0.62 dl/g., a polycarbonate resin (Lexan 121, General Electric Co., intrinsic viscosity 0.45 dl/g.), 1/8 inch glass fibers (Owens Corning P 219A) and Ferro 904 antioxidant are compounded and extruded at 450°–570° F. in an extruder. The extrudate is pelletized and injection molded at 525° F. (mold temperature 150° F.). The formulations and physical properties obtained are shown in the following table.

TABLE

| Ingredients (parts by weight) | Physical Properties | |
|---|---|---|
| | 1 | 1A* |
| poly(1,4-butylene terephthalate) | 34.8 | 70 |
| poly (ethylene terephthalate) | 20 | — |
| polycarbonate resin | 15 | — |
| fibrous glass reinforcement ⅛ inch | 30 | 30 |
| antioxidant | 0.05 | 0.05 |
| Properties | | |
| Heat Deflection Temp., °F. 264 psi | 340 | 400 |
| Melt viscosity, at 520 °F., poise | 9350 | 6,000 |
| Notched Izod impact, ft. lbs./in. | 1.99 | 1.7 |
| Tensile strength, psi | 16,000 | 17,000 |
| Flexural modulus, psi | 1,200,000 | 1,000,000 |
| Flexural strength, psi | 28,200 | 27,500 |
| Specific gravity | 1.536 | 1.53 |

*control-typical properties

When the composition of this invention (Example 1) is injection molded into a large automotive part, the warpage is 0.078 inches (measured on a 26 inch span). In contrast thereto, an identical part molded from the control sample (1A*) has a significantly increased warpage of 0.198 inches.

Obviously, other modifications and variations of the present invention are possible in the light of the above teachings. It is therefore, to be understood that changes may be made in the particular embodiments described above which are within the full intended scope of the invention as defined in the appended claims.

I claim:

1. A thermoplastic molding composition which, after molding, possesses increased resistance to warpage, the composition comprising, in intimate admixture:
   (a) a poly(1,4-butylene terephthalate) resin;
   (b) a poly(ethylene terephthalate) resin;
   (c) a polycarbonate resin having repeating units of the formula

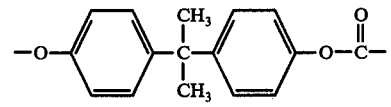

and
   (d) a reinforcing agent comprising glass fibers in an amount at least sufficient to provide reinforcement.

2. A composition as defined in claim 1 wherein the polycarbonate resin has an intrinsic viscosity of at least about 0.3 deciliters per gram when measured in a solution in methylene chloride at 20° C.

3. A composition as defined in claim 2 wherein the polycarbonate resin has an intrinsic viscosity of from about 0.3 to about 0.45 deciliters per gram when measured in a solution in methylene chloride at 20° C.

4. A composition as defined in claim 1 wherein the polycarbonate resin consists of from 100 to 400 of said repeating units.

5. A composition as defined in claim 1 wherein the fibrous glass reinforcement is present in an amount of at least about 1% by weight of the combined weights of (a), (b), (c) and (d).

6. A composition as defined in claim 5 wherein the fibrous glass reinforcement is present in an amount of from about 1 to about 60% by weight of the combined weights of (a), (b), (c) and (d).

7. A composition as defined in claim 1 which includes a flame retardant amount of a flame retardant agent.

* * * * *